United States Patent
Trabelsi et al.

(10) Patent No.: US 9,514,494 B2
(45) Date of Patent: Dec. 6, 2016

(54) PREVENTION OF COALITION ATTACKS IN SOCIAL NETWORK COMMUNITIES

(75) Inventors: Slim Trabelsi, Nice (FR); Michele Bezzi, Le Haust Sartoux-Valbonne (FR); Gilles Montagnon, Mougins (FR)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 13/593,179

(22) Filed: Aug. 23, 2012

(65) Prior Publication Data
US 2014/0059203 A1 Feb. 27, 2014

(51) Int. Cl.
- G06F 15/173 (2006.01)
- G06Q 50/00 (2012.01)
- G06Q 10/10 (2012.01)

(52) U.S. Cl.
CPC ............ G06Q 50/01 (2013.01); G06Q 10/10 (2013.01)

(58) Field of Classification Search
CPC ........................................ H04L 67/22
USPC ................................ 709/223, 224
See application file for complete search history.

(56) References Cited

U.S. PATENT DOCUMENTS

| | | | | |
|---|---|---|---|---|
| 8,312,097 B1* | 11/2012 | Siegel et al. | | 709/207 |
| 2005/0171832 A1* | 8/2005 | Hull | | G06Q 30/0201 705/7.29 |
| 2008/0281622 A1* | 11/2008 | Hoal | | G06Q 50/01 705/319 |
| 2011/0289011 A1* | 11/2011 | Hull et al. | | 705/319 |
| 2012/0066618 A1* | 3/2012 | Barker | | G06F 17/30185 715/753 |
| 2012/0296965 A1* | 11/2012 | Srivastava | | G06Q 50/01 709/204 |
| 2013/0151609 A1* | 6/2013 | Rubinstein | | H04L 51/32 709/204 |
| 2013/0185220 A1* | 7/2013 | Good | | G06Q 50/01 705/329 |

OTHER PUBLICATIONS

Evgeny Morozov, The Net Delusion: The Dark Side of Internet Freedom (New York: Public Affairs, 2011), 431 pages.
Crowdsourcing the Censors: A Contest, retrieved from http://tech.slashdot.org/story/11/04/15/1545213/Crowdsourcing-the-Censors-A-Contest, Apr. 15, 2011, 19 pages.
J.G. Breslin, A. Harth, U. Bojars, S. Decker, "Towards Semantically-Interlinked Online Communities", Proceedings of the 2nd European Semantic Web Conference (ESWC '05), LNCS vol. 3532, pp. 500-514, Heraklion, Greece, 2005.

* cited by examiner

*Primary Examiner* — Wing F Chan
*Assistant Examiner* — Andrew Woo
(74) *Attorney, Agent, or Firm* — Brake Hughes Bellermann LLP

(57) ABSTRACT

A report handler may receive abuse reports from reporters alleging policy violations of network use policies by at least one potential victim, and a source analyzer may determine at least one subset of the reporters. A content analyzer may determine a reference to the at least one potential victim in network activities of the at least one subset, and a review requester may generate a notification of a potential coalition attack against the at least one potential victim, based on the reference in the context of the at least one subset.

13 Claims, 4 Drawing Sheets

PREVENTION OF COALITION ATTACKS IN SOCIAL NETWORK COMMUNITIES

TECHNICAL FIELD

This description relates to management of online communities.

BACKGROUND

Social network communities provide useful and convenient communication between users. For example, some social networks provide each user with an individual website, and may provide each user with an ability to search among the individual websites, to link individual ones of the websites to one another in a desired fashion, or to otherwise utilize the websites in a desired fashion. In these and other types of social networks, one or more such websites (or similar websites, and/or portions thereof) may be provided to serve as common forums for some or all of the members of the relevant social network.

Thus, such social networks may serve as valuable tools for individuals and/or businesses, and may be used, e.g., for discussions, information sharing, marketing, and collections of user feedback. Thus, although such social network communities may include a central authority which governs operations thereof, the day-to-day functions of such social network communities include the providing of platforms for use in the free expression of ideas and opinions.

Nonetheless, it is generally desirable to provide reasonable limits on such expressions. For example, it is generally desirable to limit hateful, violent, inciting, or other forms of abusive expressions of ideas/opinions. It also may be desirable to prevent or limit certain fraudulent or other undesirable types of commercial activities (e.g., unsolicited offers, advertisements, emails, or other spamming activities). Consequently, many social network communities provide one or more mechanisms for collecting reports of such abuse on the part of one or more users. For example, users may be allowed to report abusive behavior on the part of another user to the central control/authority of the social network community in question. In this way, for example, abusive users may theoretically be held responsible for their actions.

In practice, however, many social network communities may include a large number of users and/or a relatively limited central authority. Consequently, it may be difficult for the central authority to provide an appropriate response to reports of abusive user behavior.

SUMMARY

According to one general aspect, a system may include instructions recorded on a non-transitory computer readable storage medium and executable by at least one processor. The system may include a report handler configured to cause the at least one processor to receive abuse reports from reporters alleging policy violations of network use policies by at least one potential victim, and a source analyzer configured to cause the at least one processor to determine at least one subset of the reporters. The system may further include a content analyzer configured to cause the at least one processor to determine a reference to the at least one potential victim in network activities of the at least one subset, and a review requester configured to cause the at least one processor to generate a notification of a potential coalition attack against the at least one potential victim, based on the reference in the context of the at least one subset.

According to another general aspect, a computer-implemented method for causing at least one processor to execute instructions recorded on a computer-readable storage medium may include receiving abuse reports from reporters alleging policy violations of network use policies by at least one potential victim, and determining at least one subset of the reporters. The method may further include determining a reference to the at least one potential victim in network activities of the at least one subset, and generating a notification of a potential coalition attack against the at least one potential victim, based on the reference in the context of the at least one subset.

According to another general aspect, a computer program product may be tangibly embodied on a non-transitory computer-readable medium and may include instructions that, when executed, are configured to cause at least one processor to receive abuse reports from reporters alleging policy violations of network use policies by at least one potential victim, and determine at least one subset of the reporters. The instructions, when executed, may further cause the at least one processor to determine a reference to the at least one potential victim in network activities of the at least one subset, and generate a notification of a potential coalition attack against the at least one potential victim, based on the reference in the context of the at least one subset.

The details of one or more implementations are set forth in the accompanying drawings and the description below. Other features will be apparent from the description and drawings, and from the claims.

DETAILED DESCRIPTION

Figure 1:
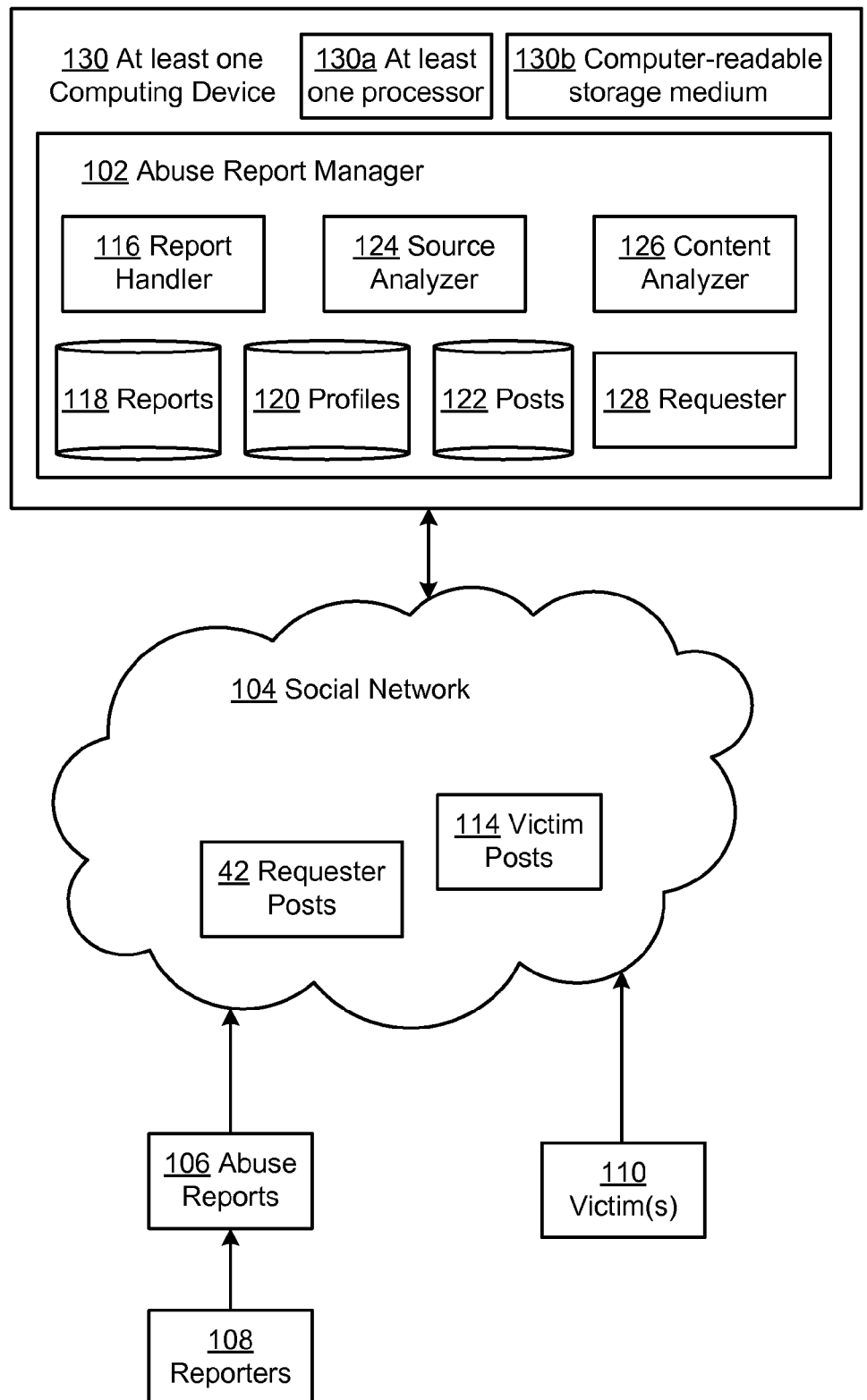
FIG. 1 is a block diagram of a system for preventing coalition attacks in social network communities.

FIG. 1 is a block diagram of a system 100 for preventing coalition attacks in social network communities. In the example of FIG. 1, an abuse report manager 102 may be configured to oversee operations of a social network 104 with respect to receipt of abuse reports 106 which are submitted by a plurality of reporters 108, with respect to one or more victims 110. More specifically, as described in detail below, the abuse report manager 102 may be configured to prevent or reduce instances of coalition attacks, in which the reporters 108 submit the abuse reports 106 for the purpose of censoring or otherwise inconveniencing the victims 110, and for reasons which are not actually related to violations of a network use policy on the part of the victims 110.

In other words, as referenced above, it is well known that the social network 104 and included communities may implement various use policies designed to govern behaviors of all registered users. Since such social network communities are often designed to encourage open, free communication, such use policies are often intended merely to restrict fragrantly abusive behavior. For example, such use policies may prohibit communications which are insensitive or insulting to a particular race, religion, or other group, communications which incite violence or other illegal actions, or any other communications which are considered to be sufficiently outside the bounds of civil discourse.

In practice, the implementation of such use policies may be difficult for a number of reasons. For example, the definition and recognition of the types of prohibited communications referenced above may be highly subjective, and may be prone to misinterpretation and other errors. Moreover, the social network 104 may have a large number of users, and, in particular, may have a large number of users relative to a number of human administrators who are available to oversee implementation of the use policies. Still further, even if a larger number of administrators are available, it may occur that the abuse reports 106 are received in a variety of languages, thereby making a review of the subject matter of the abuse reports 106 difficult or impossible for reviewing administrators who are not conversant in the relevant languages.

For these and other reasons, conventional techniques for implementing the types of use policies referenced above may include simplified responses to received abuse reports. For example, conventional handling of abuse reports may include tracking a number of abuse reports received with respect to a particular user or group of users, and then banning or otherwise removing or censoring the relevant user/group once a particular number of abuse reports have been received.

In this context, a coalition attack may be understood to represent and include types of attacks which rely on the just-described shortcomings and deficiencies of existing abuse report systems of social networks to obtain a desired result. In particular, for example, it may occur that the one or more victims 110 have complied entirely with all relevant use policies of the social network 104. However, due to ideological or other differences between the one or more victims 110 and the various reporters 108, the reporters 108 may nonetheless desire to have the one or more victims 110 banned, censored, or otherwise punished or inconvenienced.

Consequently, the various reporters 108 may directly or indirectly conspire with one another to collaboratively submit a large number of the abuse reports 106. In conventional settings, such submissions of abuse reports in sufficient numbers may be enough to trigger a desired penalty against the one or more victims 110.

In this regard, it may be appreciated that the social network 104 may provide various opportunities for users of the social network 104, including the reporters 108 and the victims 110, to participate in communications with one another. By themselves, the various communication techniques provided by the social network 104 are generally well known, and are therefore not described here in detail, except as may be necessary or helpful in understanding operations of the system 100 of FIG. 1.

By way of non-limiting example, however, the social network 104 may provide bulletin boards, discussion forums, chat rooms, and other venues in which the various users of the social network 104 may participate in synchronous or asynchronous communications with one another. In other examples, the social network 104 may provide users with an opportunity to create and update personal or group pages or websites, so that, e.g., users may publish personal blogs, or otherwise publish or provide information to specified subsets of users of the social network 104, or to all users of the social network 104. In still other examples, corporate users of a social network 104 may publish news articles or other corporate-sponsored information (e.g., product descriptions of items for sale, or marketing information), and other users of the social network 104 may be provided with an opportunity to submit comments or reviews which are then viewable by users of the social network 104 at large.

In the example of FIG. 1, any and all of the above-described types of communications conducted via the social network 104, as well as any other type of applicable communication not specifically mentioned, may be represented by post 112, 114. More specifically, as shown, the post 112 may be understood to represent various posts provided by the reporters 108, while the post 114 may represent posts from the one or more victims 110. Thus, as described in various examples below, the posts 112, 114 may exist in the same and/or different context as one another. For example, the victim post 114 may occur in a particular discussion forum, while the reporter post 112 may exist in a different discussion forum. Moreover, since the posts 112, 114 may represent pluralities of posts, it may be appreciated that some of the victim posts 114 may occur in a particular discussion forum that is also populated by some or all of the reporter posts 112, while other victim posts 114 may occur in separate/different contexts.

In many situations, it may occur that the posts 112, 114 are accessible to all users of the social network 104. For example, one of the victim posts 114 may be provided in the context of a particular discussion board that is publicly available. In other examples, however, some of the posts 112, 114 may be restricted, so that only an authorized subset of the users of the social network 104 may be able to view the content thereof.

In many of the examples that follow, it is assumed that the reporters 108 have direct or indirect access to at least a portion of the content of the victim post 114. In these and other scenarios, as referenced above, it may occur that the one or more victims 110 express some idea or take some action which one or more the reporters 108 find to be objectionable, even though there may be no (or only limited) actual violation(s) of the use policies of the social network 104.

For example, one of the victims 110 may express a religious or political view point which is objectionable to at least some of the reporters 108. In other examples, the victims 110 may be fans of a first sports team, while the reporters 108 may be fans of a rival sports team. More generally, it may occur that the victims 110 express support for any group or idea with which they affiliate themselves, while some or all of the reporters 108 may affiliate themselves with a competing or opposing group or idea. Such affiliations may be, for example, racial, ethnic, philosophical, or geographic. In a more general case, the victims 110 may express virtually any content, or have any characteristic which some or all of the reporters 108 find objectionable.

Thus, as referenced above, the reporters 108 may mount a coalition attack against at least one victim of the victims 110, by submitting the abuse reports 106 to an administrator of the social network 104. The abuse reports 106 may inaccurately or falsely allege violation of the use policies of the social network 104, or may express more general or abstract negative feedback against the specified victim 110. As also described, in conventional settings, the submission of a sufficient number of the abuse reports 106 may be adequate to cause an automatic censor, ban, or other penalty against the victim 110, particularly when the abuse reports 106 represent a relatively small subset of a larger number of abuse reports being continually received by the administrator of the social network 104.

In the system 100 of FIG. 1, however, the abuse report manager 102 is configured to provide a sophisticated, adaptable, algorithmic response to the abuse reports 106, in order to thereby determine the existence of a possible or actual coalition attack by the reporters 108 against the victim 110. In this way, for example, the victim 110 may be prevented from experiencing inconvenience or other difficulty that may be associated with an unfair or inappropriate penalty levied incorrectly as a result of the coalition attack of the reporters 108. Moreover, if the reporters 108 become aware that such coalition attacks are unlikely to be successful, and/or are likely to result in penalties against the reporters 108 themselves, then the reporters 108 will be less likely to attempt such coalition attacks in the future. Consequently, the social network 104 will be better able to serve the purpose of providing a forum for the free exchange of opinions and information.

In the example of FIG. 1, the abuse report manager 102 may include a report handler 116 which is configured to receive incoming abuse reports 106, for storage thereof using a reports repository 118. As described in detail below, or as would be apparent, the report handler 116 may perform various processing tasks with respect to the incoming abuse reports 106. For example, the report handler 116 may store the abuse reports 106 within the reports repository 118 in a specified or desired fashion. For example, the report handler 116 may process an incoming abuse report 106 and extract an identity, name, or other identifier of the alleged abusive user (e.g., the victim 110), and may thus store the abuse reports 106 within the reports repository 118, within report records which are sorted/characterized or otherwise stored based on an identifier of the alleged abuser.

In addition to these identifiers, as also described in more detail below, the report records stored within the reports repository 118 may include various other relevant pieces of information. For example, the report records may include a time of receipt of the abuse report, a source of the abuse report, any textual or other content of the abuse report, or virtually any other information characterizing the abuse report. In populating the reports repository 118 in this manner, the report handler 116 may consult various other sources of information. For example, a profile repository 120 may include profiles of individual users of the social network 104, including any or all of the reporters 108 and the victims 110.

For example, the profiles repository 120 may include information regarding a length of time of membership in the social network of an individual user, and/or may include more detailed information regarding a relevant user, such as the user's age, occupation, preferences, usage history of the social network 104, and virtually any other information which the user in question wishes to share in the context of the social network 104.

In a particular aspect, the profiles repository 120 may include information describing any groups to which a particular user belongs. For example, a particular user profile may list one or more groups to which that user belongs. Conversely, the profiles repository 120 may include group profiles which include individual groups and associated information characterizing the groups, including individual users which are administrators or other members thereof.

In a further aspect, a post repository 122 may include (or otherwise reference or identify) all of the posts 112, 114 which have been posted over time by the various users of the social network. Of course, the various posts may be orga-nized and accessible in a variety of different manners. For example, posts may be organized on the basis of an original context in which the posts or submitted to the social network 104, e.g., may be stored based on a discussion forum, bulletin board, article, blog, or other setting or scenario at which posting occurred. In other examples, the posts of the post repository 122 may be accessible based on a unique identifier associated with the user who was the author of the post. Similarly, the post may be accessible based on a group membership or affiliation of the user who was the author of the post.

Thus, it may be appreciated that the report handler 116 may utilize the profiles repository 120 and the post repository 122 to assist in populating report records of the reports repository 118. For example, upon receipt of an abuse report 106, the report handler 116 may extract any desired or necessary information from the abuse report 106 itself, and may also determine any relevant meta information characterizing the abuse report (e.g., a time of receipt, or a network location of the source of the abuse report). Additionally, the report handler 116 may consult the profiles repository 120 to determine any relevant or desired information regarding profiles of either the reporter 108 from whom the abuse report 106 was received, and/or of the victim 110 who is alleged to have behaved abusively. In particular, as described, group profile information characterizing one or more groups to which each of the reporter 108 and the victim 110 belong may be obtained.

Further, the report handler 116 may consult the post repository 122, in order to determine any relevant or desired posts (or aspects thereof) which may have been submitted by, or otherwise related to, either or both of the reporter 108 and the victim 110. Depending on a quantity or other characteristics of the post 122, the report handler 116 may utilize only a subset of posts of the reporters 108 and/or the victims 110. For example, the report handler 116 may utilize only those posts which have been submitted in a recent, defined timeframe, and/or those posts which are associated with groups to which the reporters 108 and/or the victims 110 belong, as determined from consultation of the profiles repository 120. Additional possible details characterizing operations of the report handler 116 in populating report records of the reports repository 118 are described below, or would be apparent.

Meanwhile, a source analyzer 124 may be configured to analyze the abuse reports 106, and related information as described in more detail herein, in order to determine potential relationships between one or more subsets of the reporters 108. For example, the source analyzer 124 may consult the profiles repository 120 to determine whether subsets of the reporters 108 exist in which all members of the subset belong to the same or related groups defined by one or more group profiles. Somewhat similarly, the source analyzer 124 may consult the post repository 122 to determine relationships between reporter posts 112 contained therein. For example, the source analyzer 124 may determine that subsets of the reporters 108 exist in which each member of the subset has recently submitted posts within a same or similar context, e.g., have submitted posts on a particular discussion board, blog, or chat room. Additional examples of techniques that may be used by the source analyzer 124 to determine potential relationships between subsets of the reporters 108 which are the sources of the abuse report 106 are described in more detail below, or would be apparent to one of skill in the art.

Meanwhile, a content analyzer 126 may be configured to analyze appropriate posts of the post repository 122, including, e.g., some or all of the reporter posts 112 and/or the victim post 114. In particular, for example, the contents analyzer 126 may analyze the reporter posts 112, in order to determine whether the reporter posts 112 include content or other reference to the one or more victims 110.

In practice, as referenced above, outputs of the source analyzer 124 and the content analyzer 126 may be stored using the reports repository 118. For example, the report handler 116 may be configured to update individual report records of the reports repository 118 to reflect information obtained from the source analyzer 124 and/or the contents analyzer 126. In additional or alternative examples, the report handler 116 may include a separate database record which contains information regarding relationships between subsets of the reporters 108, relevant content or other information provided by the contents analyzer 126, or any other information which may be useful in determining a possible occurrence of a coalition attack, as described in more detail below, or as would be apparent to one of skill in the art.

However stored, information obtained/provided by the report handler 116, the source analyzer 124, and/or the contents analyzer 126 may be accessed by a review requester 128, and utilized thereby to determine whether a possible coalition attack has occurred. For example, in a simplified example, it may occur that the source analyzer 124 determines that 80% of the reporters 108 belong to a single group, in accordance with a corresponding group profile stored in the profiles repository 120, and that reporter posts 112 posted in the context of a discussion forum that is restricted to group members of the group in question include reference to the one or more victims 110. In such scenarios, the review requester 128 may determine a relatively high likelihood of a possible coalition attack, and may accordingly notify an administrator of the social network 104, and thereby request review of the situation by the administrator, for a final determination as to whether and how to censor or otherwise penalize the one or more victims 110, if at all.

More generally, the review requester 128 may be configured to implement one or more of a plurality of possible algorithms designed to utilize outputs of the report handler 116, the source analyzer 124, and the content analyzer 126, among other additional/alternative sources of information, to thereby determine a relative likelihood of a coalition attack. As will be apparent from the below description, such algorithms may be selected, adjusted, and/or combined in a variety of manners.

For example, some algorithms may be created and/or implemented in a manner that is designed to be highly inclusive with respect to determining possible coalition attacks. Advantageously, in such scenarios, the review requester 128 may be likely to correctly identify actual coalition attacks. On the other hand, in such scenarios, the review requester 128 may consume a relatively large amount of resources, and, moreover, may require a relatively large or extensive amount of review by one or more administrators of the social network 104.

Conversely, in other implementations, the review requester 128 may be highly restrictive in determining a possible coalition attack. Although the review requester 128 may be less likely to provide false positives (in comparison to the scenarios just described), such scenarios run a higher risk of failing to identify a coalition attack.

Advantageously, operations of the review requester 128 may be adjusted accordingly to achieve a desired result. For example, if an administrator of the social network 104 has reason to be suspicious of the possibility of coalition attacks, then the administrator may configure the abuse report manager 102 to be highly inclusive in identifying possible coalition attacks. On the other hand, if the administrator of the social network 104 is aware that human resources available for reviewing possible coalition attacks are relatively low, then the administrator may cause the abuse report manager 102 to be less inclusive in identifying possible coalition attacks.

Aside from adjusting a level of inclusion of possible coalition attacks, a number of different approaches may be taken by the abuse report manager 102 in attempting to accurately identify possible coalition attacks. In general, the various approaches may be associated with corresponding trade-offs in terms of consumption of available resources relative to levels of accuracy achieved in identifying possible coalition attacks. For example, a number of factors collected and/or utilized by the abuse report manager 102 may vary widely. Variations of such algorithms are described in detail below, and, based on these non-limiting examples, various other algorithms may be designed and implemented, as well.

Thus, the system 100 of FIG. 1 provides an environment in which potential coalition attacks may be recognized and prevented, and in which a likelihood of future coalition attacks occurring may be reduced. In the example of FIG. 1, the social network 104 may represent a closed network that is physically or logically restricted from public access, even though some or all of the social network 104 may be implemented in the context of a publicly available network, such as the public internet. Of course, other example implementations of the social network 104 may have greater or lesser degrees of public availability. For example, some examples of the social network may be entirely open and available to the public at large, while other example implementations may be implemented as closed networks (e.g., in the context of a corporate network).

Somewhat similarly, the abuse report manager 102 may be implemented in a variety of example embodiments, not all of which are described herein in detail. For example, in the example of FIG. 1, the abuse report manager 102 is illustrated as executing in the context of at least one computing device 130, which includes at least one processor 130a and computer readable storage medium 130b. Thus, it may be appreciated, for example, that the abuse report manager 102 may be implemented using a single computing device 130 having multiple processors 130a (e.g., executing parallel processing therewith), or may be implemented using multiple computing devices 130 in communications with one another.

Thus, further, it will be appreciated that although the abuse report manager 102 is illustrated as a single module including the various components 116-128, in fact the abuse report manager 102 may be implemented as a plurality of modules executed using a plurality of processors/computing devices. For example, the various repositories 118, 120, 122 may represent data stores which are located remotely from the operational modules 116 and 124-128 of the abuse report manager 102.

Still further, it may be appreciated that any single module or component of the abuse report manager 102 may be implemented using two or more separate subcomponents thereof. Conversely, any two or more modules or components may be combined and utilized as a single component/module.

Figure 2:
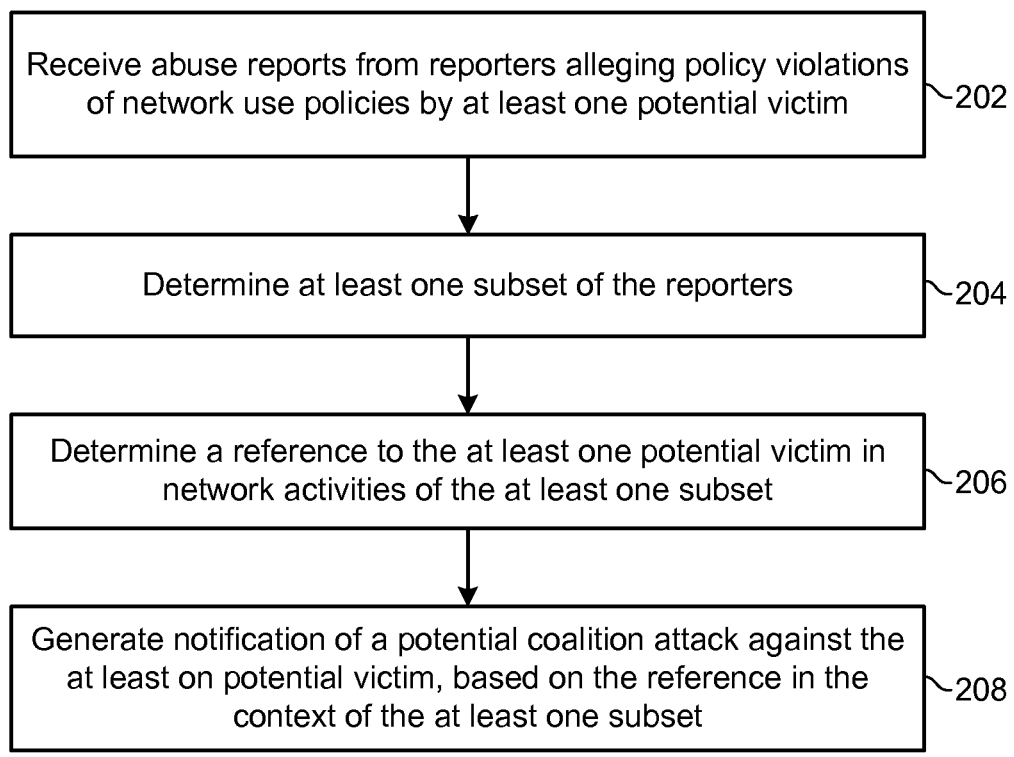
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as separate, sequential operations. However, it may be appreciated that the flowchart 200 illustrates non-limiting example implementations, and that in other implementations, the various operations 202-208 may be executed in a manner different from that specifically illustrated in FIG. 2. For example, two or more of the operations 202-208 may be executed in a partially or completely overlapping or parallel manner, and/or may be executed in a nested, iterative, or looped fashion. Further, additional or alternative operations may be included, and one or more operations may be omitted.

In the example of FIG. 2, abuse reports may be received from reporters alleging policy violations of network use policies by at least one potential victim (202). For example, the report handler 116 may receive the abuse reports 106 from the abuse reporters 108 regarding the potential victim 110, and may thereafter store one or more corresponding report records in the reports repository 118. As referenced, the report records may be stored and/or accessed based on, e.g., identities of the abuse reporters 108, the identity of the potential victim 110, or various other factors. For example, the report handler may record times of receipts of the abuse reports 106, network or geographical locations from which the abuse reports 106 originated, and various other types of related information, as described or as would be apparent.

In practice, the report handler 116 may receive the abuse reports 106 over a relatively lengthy period of time (e.g., days or weeks), or may receive most or all of the abuse reports 106 within a relatively short period of time. Further, the report handler 116 may receive a relatively small number or relatively large number of the abuse reports 106 within a given timeframe.

The report handler 116 may be responsible for triggering further verification operations of the abuse report manager 102 with respect to determining that a coalition attack exists. For example, the report handler 116 may trigger further operations for detecting a possible coalition attack in response to a defined absolute number ("N") of abuse reports 106, or a relative number of abuse reports, e.g., defined with respect to previous abuse reports received from the reporters 108 and/or against the potential victim 110. As may be appreciated, such threshold numbers of abuse reports may be adjusted relative to other factors, e.g., relative to a window of time over which the abuse reports were received. For example, a smaller threshold may be defined with respect to abuse reports received relatively quickly over a short timeframe.

At least one subset of the reporters may be determined (204). For example, the source analyzer 124 may be configured to analyze information characterizing the reporters 108. In practice, as referenced, the source analyzer 124 may be configured to obtain source-related information from various sources, e.g., any of the repositories 118, 120, 122.

In practice, for example, the source analyzer 124 may determine whether the profiles repository 120 includes one or more group profiles defining one or more corresponding groups, and may determine whether a threshold number of the abuse reporters 108 are included as members thereof. In additional or alternative examples, the source analyzer 124 may analyze various other criteria which might be used to characterize common interest or other commonalities between subsets of the abuse reporters 108.

For example, the source analyzer 124 may determine a number of common page visits on the part of a threshold number of the abuse reporters 108. In other words, even if the abuse reporters 108 do not generally belong to one or more identifiable groups defined by the profiles in the profiles repository 120, it may occur that a large number or percentage of abuse reporters 108 have recently visited a particular website, thereby providing an indication of common interests and potential collaboration among those identified abuse reporters.

In some cases, particular websites may be classified as being associated with particular ideologies or other interests which may have been previously associated with potential coalition attacks, which may be considered by the source analyzer 124 in determining whether to define a subset of the abuse reporters 108, as such, for purposes of verifying a possible coalition attack.

Thus, it may be appreciated that the threshold number of abuse reporters required by the source analyzer 124 to define a subset for purposes of verifying a possible coalition attack may be defined in various manners. For example, the threshold number may be defined as an absolute number, or as a percentage of the total number of abuse reporters 108, where either metric may be adjusted accordingly for other factors, e.g., the just-mentioned characterization of a group or commonly-visited website as being associated with an ideology or common interest potentially associated with a coalition attack.

Various other techniques may be utilized to determine the subset. For example, the source analyzer 124 may consider recommendations to report the victim 110, where the recommendations are provided by or in association with a particular group defined in the profiles repository 120. The source analyzer 124 may consider whether a threshold number of the abuse reporters 108 have followed these recommendations, even if the abuse reporters 108 following the recommendation are not themselves members of the group in question. Further, the source analyzer 124 may consider various blogs, discussion forum comments, and other posts 112 of the abuse reporters 108 in assessing a possible common interest of a subset thereof. In yet further examples, the source analyzer 124 may consider individual user profiles of the abuse reporters 108 as stored in the profiles repository 120, e.g., so as to determine potential common interests there between. Of course, various combinations of these techniques, and/or other techniques, also may be utilized.

A reference to the at least one potential victim and network activities of the at least one subset may be determined (206). For example, the content analyzer 126 may determine that posts 112 of the defined subset of the abuse reporters 108 include one or more references to the potential victim 110 identified in the abuse reports 106.

In practice, the content analyzer 126 may detect a uniform resource identifier (URI) which identifies the potential victim 110 and which is included in any context or activity associated with the defined subset. For example, in addition to the just-referenced identification of posts referencing the potential victim 110, the content analyzer 126 may identify a reference to the potential victim 110, e.g., in communications from an administrator of a group to some or all members of that group who are also included in the subset defined with respect to the abuse reporters 108. The content analyzer 126 also may determine page visits by abuse reporters of the defined subset to pages associated with the potential victim 110, e.g., a personal and/or public blog published by the potential victim 110.

As referenced above, the abuse report manager 102 may have access to classifications of various websites and/or groups as being affiliated with ideologies or other interests which may be associated with potential coalition attacks. Such classifications may be made proactively, and/or may thereafter be updated based on actual coalition attacks that are verified by the administrator of the social network 104. In other words, for example, if at a previous time a particular website was associated with a coalition attack, then future abuse reports received from members or visitors of that website may be more likely to be considered as being associated with a current or future coalition attack.

Then, if the potential victim 110 is a member of a class or group that is classified as being in potential opposition to the classified class or group identified with respect to the subset of the abuse reporters 108, a determination of a possible coalition attack may be more likely. Somewhat similarly, if the potential victim 110 is not a member of the group in question, a coalition attack also may be considered to be relatively more likely. On the other hand, such a factor may not be dispositive, since the potential victim 110 may attempt to join the group in question as a preemptive or defensive measure.

Notification of a potential coalition attack against the at least one potential victim may be generated, based on the reference in the context of the at least one subset (208). For example, the review requester 128 may generate and send a message to an administrator of the social network 104. The message may contain relevant information utilized or derived by the review requester 128 in determining to generate the message.

Thereupon, the administrator of the social network 104 may make a decision regarding whether and/or how to proceed with respect to the abuse reports 106. For example, the administrator may decide that, notwithstanding the various factors relied upon by the review requester 128, a coalition attack is unlikely to have occurred. In such a case, the administrator may precede with censoring, banning, suspending, or otherwise penalizing the potential victim 110. On the other hand, if the administrator of the social network 104 believes that a coalition attack may have occurred, then the administrator may decline to administer any immediate penalty to the potential victim 110.

The administrator may take various follow-up actions in such scenarios. For example, the administrator may request more information from some or all of the abuse reporters 108 and/or the at least one potential victim 110, or may notify the review requester 128 to update its operations to reflect the occurrence of the potential coalition attack (e.g., may cause the review requester 128 to be more likely to determine coalition attacks in the future with respect to the relevant subset and/or potential victim 110).

In the latter regard, for example, the administrator may utilize a feature of the abuse report manager 102 reflecting the fact that multiple instances of possible coalition attacks with respect to the same reporters 108 and/or victim 110 may reflect an increasing likelihood that one or more coalition attacks has in fact occurred. Moreover, the administrator of the social network 104 may implement censoring, banning, suspensions, or other penalties against the abuse reporters who have been determined to have lodged a coalition attack.

Further, the notification generated by the review requester 128 may include a notification to the abuse report manager 102, including a decision to treat the abuse reports 106 as part of a coalition attack, or to proceed with penalties against the victim 110. For example, the abuse report manager 102 may be configured to make such decisions of a human administrator of the social network 104, although the administrator may retain the option of reviewing and reversing the resulting automated decisions.

Figure 3:
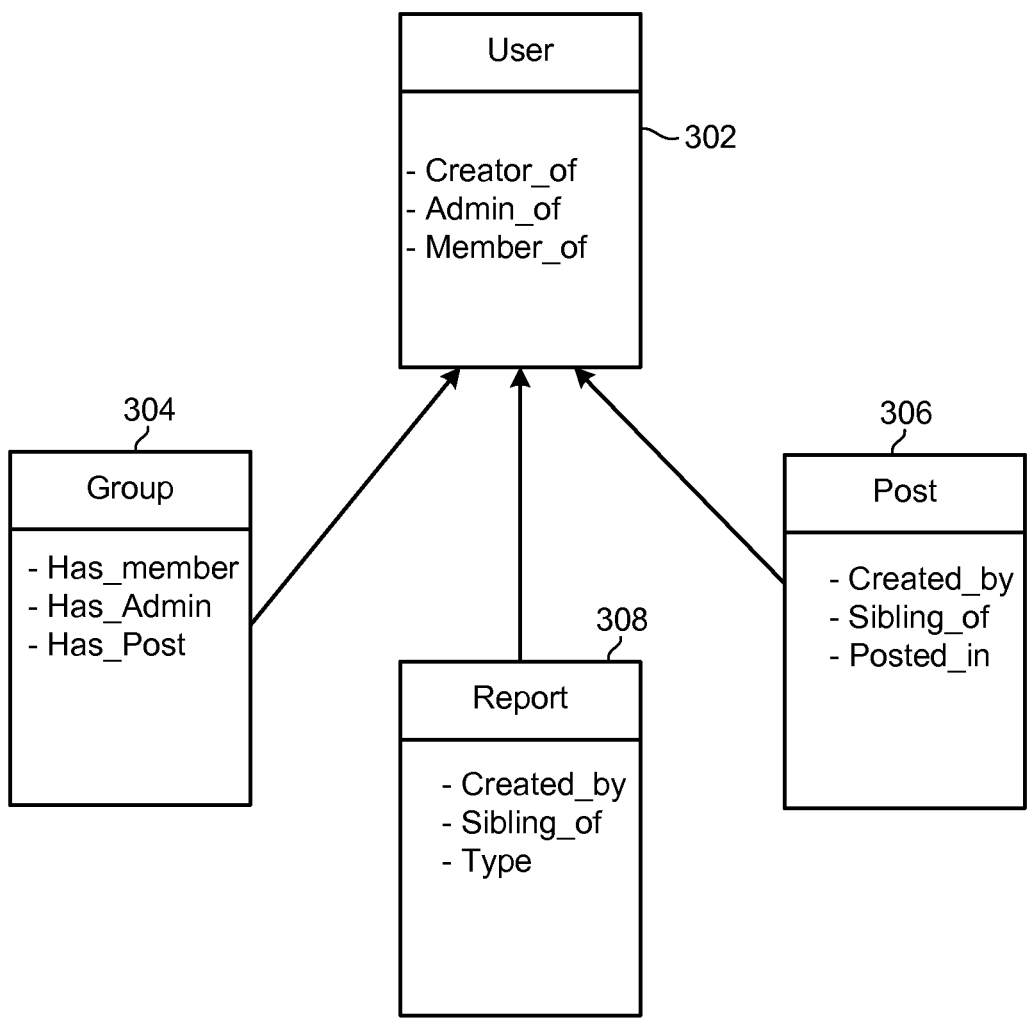
FIG. 3 is a block diagram illustrating relationships and other properties of entities of social network communities in the system of FIG. 1.

FIG. 3 is a block diagram of a user interaction model which might be utilized in the system 100 of FIG. 1. In the example of FIG. 3, a user 302, as referenced above, may represent a virtual profile of any member of one or more online communities of the social network 104. As shown and/or described, users may be empowered with an ability to create and/or administrate one or more groups, may be a member of one or more groups, and may publish posts and abuse reports.

More specifically, a group 304 may refer to a set of users sharing a common interest and communicating with one another in that context within the social network 104. The group 304 may be structured as a hierarchical community with a group creator and/or a group administrator, or may be implemented as a single layer of users having equal rights with one another. As shown, the group 304 may include (e.g., reference or provide a link to) one or more posts associated therewith.

A post 306 may include a message or text posted by the user 302 in the social network 104. As shown, the post 306 may include information, such as, e.g., a uniform resource identifier (URI) which uniquely identifies a creating user. Somewhat similarly, the post 306 may be identified as a sibling of another post and/or of the user 302. In this context, as just referenced, the term sibling may be understood to represent any entity of the social network 104 (e.g., any profile or post in the profile repository 120 and the post repository 122, respectively) which is related or linked to another entity. For example, as shown, the post 306 may be a sibling of the user 302. As also referenced, the post 306 may be a sibling of one or more other posts (not specifically illustrated in the example of FIG. 3).

Somewhat similarly, a report 308, as an example of the abuse reports 106, may represent an abuse or warning message designed to notify the administrator of the social network 104 of illegal, unethical, or otherwise unpermitted behavior on the part of the user 302. The report 308 may be created by the user (e.g., one of the abuse reporters 108), and may be a sibling of a user and/or a post. For example, the report 308 may uniquely identify the user who is the object thereof, and/or may identify a post 306 which is alleged to contain inappropriate content.

As is apparent, the example interaction model of FIG. 3 may provide relevant information which may be leveraged or otherwise utilized by the abuse report manager 102 of FIG. 1. For example, as illustrated and described, FIG. 4 and algorithm 1 below provide specific example operations of an embodiment(s) of the system 100 of FIG. 1 utilizing the interaction model of FIG. 3. Of course, it will be appreciated that such examples are non-limiting, and provided merely for the sake of illustration and explanation.

Figure 4:
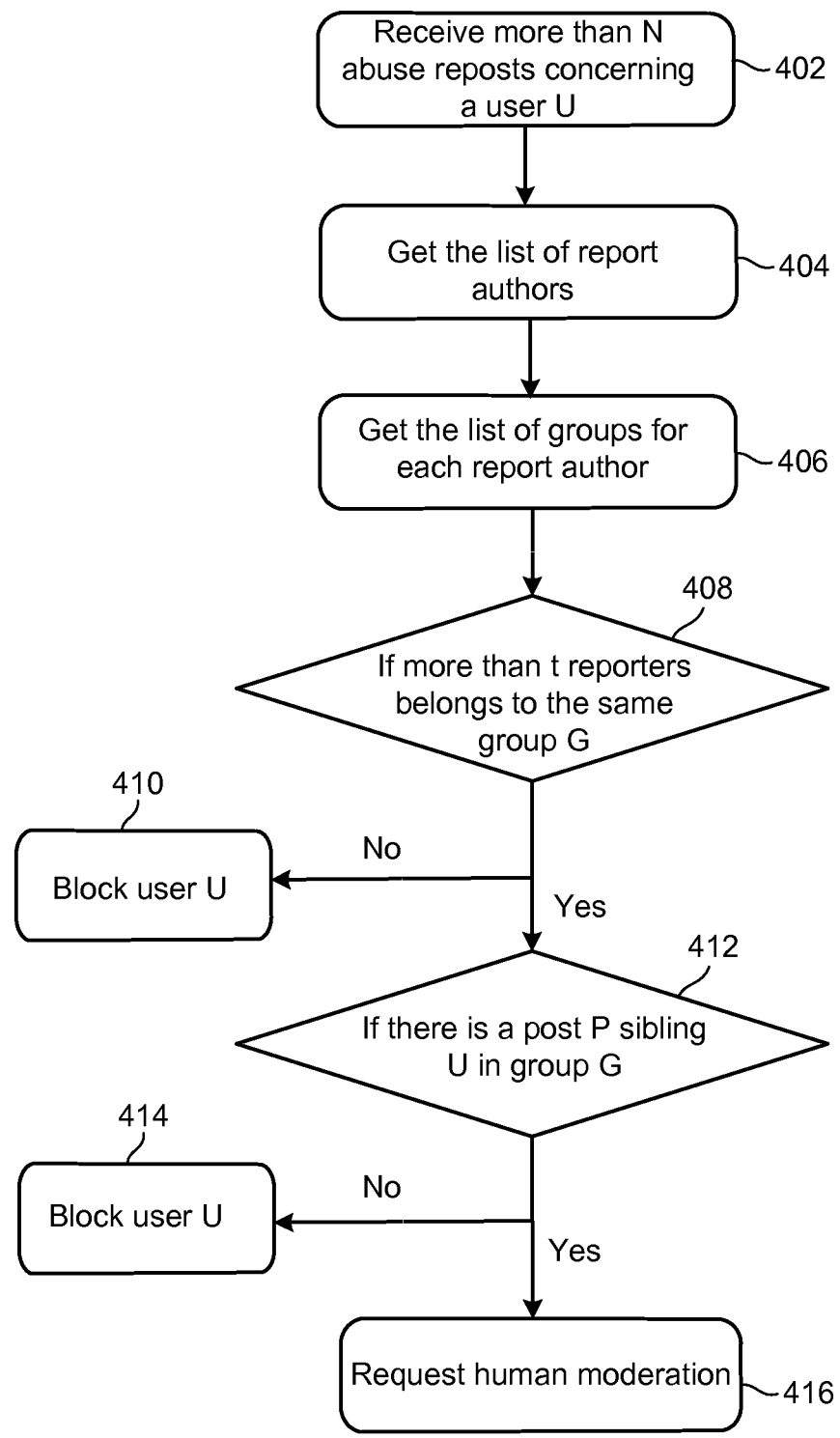
FIG. 4 is a flowchart illustrating more detailed example operations of the system of FIG. 1.

FIG. 4 is a flowchart 400 illustrating a more detailed example operation of the system of FIG. 1, utilizing the user interaction model of FIG. 3. In the example of FIG. 4, more than "N" abuse reports are received identifying a user "U" (402). For example, the report handler 116 may receive the abuse reports 106, perhaps within a defined window of time.

The source analyzer 124 may then determine directly and/or from the report handler 116, a list of all the abuse reporters 108 who are the authors of the various abuse reports (404). Further, the source analyzer 124 may obtain a list of all groups to which each abuse report author belongs (406), e.g., by consulting the profiles repository 120.

The review requester 128 may then make a determination as to whether more than a threshold "T" of the abuse reporters belong to a given group "G" (408). If not, then the review requestor 128 may directly or indirectly cause the user in question (e.g., the potential victim 110) to be blocked from using the social network 104 (410).

On the other hand, if there are more than "t" reporters belonging to at least one group "G" (408), then the content analyzer 126 may proceed to determine whether there is a post "P" which is a sibling of the user "U" in the context of the group "G" (412). If not, then the review requester 128 may directly or indirectly cause the user "U" to be blocked from usage of the social network (414). On the other hand, if such a post "P" is found to exist (412), then the review requester 128 may issue the notification requesting human moderation for a final determination as to whether the user "U" should be blocked.

Algorithm 1 provides a description of a possible implementation of the system 100 of FIG. 1, wring the interaction model of FIG. 3, in which $\Re$ is the group of N abuse reports r sibling the user s where:

---

Algorithm 1

---

$\Re = \{r_1, r_2, r_3,...,r_N\}$ |r.sibling = s
U is the group of users authors of these abuse reports
    $U = \{u_1, u_2, u_3,......,u_N\}$ |$u_t = r_t$ ,creator
$G_t$ is the list of group on which belongs all the users in U
    $G_t = \{G_1{}^t, G_2{}^t, G_3{}^t, ......\} = u_t$.subscriber
is the intersection of all the group $G_t$
    $GT = \cap\ i\ (G_t)$
such that if there is a group in GT where the number of users in U is larger than the threshold value $\tau$
    GT. count(U) > $\tau$
and if there is a GT where there is a post sibling s
    $\exists GT | GT$.post.sibling = s
Then do not block the user s and request a human moderation

---

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A system comprising:
at least one processor;
a non-transitory computer readable medium having executable instructions configured to cause the at least one processor to implement:
an abuse report manager configured to cause the at least one processor to monitor a social network for a potential coalition attack against a user of the social network, the potential coalition attack being a potential attack on the user of the social network in which reporters submit abuse reports for purposes of censoring or inconveniencing the user of the social network, the abuse report manager including,
a report handler configured to cause the at least one processor to receive a number of plurality of abuse reports from a number of reporters alleging policy violations of network use policies by the user of the social network, and to determine that the number of plurality of abuse reports exceed a first predetermined threshold;
a source analyzer configured to cause the at least one processor to determine that two or more of the number of reporters share a common interest by analyzing a profiles repository to determine whether the two or more of the number of reporters belong to a same group, the source analyzer configured to cause the at least one processor to determine whether the number of the reporters belonging to the same group is above a second predetermined threshold;

a content analyzer configured to cause the at least one processor to determine a reference to the user of the social network by analyzing social media content posted by the number of reporters belonging to the same group to determine whether the reference to the user of the social network is contained within a discussion forum that is restricted to group members of the same group; and a review requester configured to cause the at least one processor to determine whether or not the user of the social network is subject to the potential coalition attack based on the determination that the number of the reporters belonging to the same group is above the second pre-determined threshold and the determination that the reference to the user of the social network is included within the discussion forum of the same group, the review requester configured to cause the at least one processor to generate a notification of the potential coalition attack against the user of the social network.

2. The system of claim 1, wherein the number of reporters sharing the common interest are social media users visiting a common page.

3. The system of claim 1, wherein the content analyzer is configured to determine the reference as including a uniform resource identifier (URI) identifying the user of the social network.

4. The system of claim 1, wherein the content analyzer is configured to determine the reference to the user of the social network as including content identifying the user of the social network.

5. The system of claim 1, wherein the review requester is configured to generate the notification for transmission thereof to an administrator of the network use policies.

6. The system of claim 1, wherein the review requester is configured to determine that the potential coalition attack is not an actual coalition attack, and is further configured to penalize the user of the social network in accordance with the network use policy.

7. The system of claim 1, wherein the review requester is configured to determine that the potential coalition attack is an actual coalition attack, and further configured to identify the number of reporters involved as having participated therein.

8. A computer-implemented method for causing at least one processor to execute instructions recorded on a computer-readable storage medium, the method comprising:

monitoring a social network for a potential coalition attack against a user of the social network, the potential coalition attack being a potential attack on the user of the social network in which reporters submit abuse reports for purposes of censoring or inconveniencing the user of the social network;

receiving a number of the abuse reports from a number of the reporters alleging policy violations of network use policies by the user, wherein the number of the abuse reports pertaining to the user of the social network exceeds a first predetermined threshold number;

analyzing the number of abuse reports from the number of the reporters and profiles of the number of reporters to determine whether a relationship exists among two or more of the number of the reporters by analyzing a profiles repository to determine whether two or more of the number of the reporters belong to a same group;

determining whether the number of the reporters belonging to the same group is above a second predetermined threshold;

analyzing social media content posted by the two or more of the number of the reporters belonging to the same group to determine whether a reference to the user of the social network is contained within a discussion forum that is restricted to group members of the same group;

determining whether or not the potential victim is subject to the potential coalition attack based on the determination that the reference to the user of the social network is contained within the discussion forum of the same group and the determination that the number of the reporters belonging to the same group is above the second predetermined threshold; and generating a notification when the potential victim is subject to the potential coalition attack.

9. The method of claim 8, wherein the relationship indicates at least one commonality between the two or more of the number of the reporters.

10. The method of claim 8, wherein the reference to the user includes a uniform resource identifier (URI) identifying the user of the social network associated with the social media content posted by the two or more of the number of the reporters.

11. A computer program product, the computer program product being tangibly embodied on a non-transitory computer-readable medium and comprising instructions that, when executed, are configured to cause at least one processor to:

monitor a social network for a potential coalition attack against a user of the social network, the potential coalition attack being a potential attack on the user of the social network in which reporters submit abuse reports for purposes of censoring or inconveniencing the user of the social network;

receive a number of the abuse reports from a number of the reporters alleging policy violations of network use policies by the user, and determine that the number of the abuse reports exceeds a first predetermined threshold;

analyze the number of the abuse reports of the number of the reporters and profiles of the number of the reporters to determine whether two or more of the number of the reporters are members of a same group based on one or more group profiles stored in a profiles repository;

determine whether the number of the reporters belonging to the same group is above a second predetermined threshold;

analyze social media content posted by the members of the same group to determine whether or not a reference to the user of the social network is contained within a discussion forum that is restricted to the members of the same group; and generate a notification of the potential coalition attack against the user of the social network based on the determination that the number of the reporters belonging to the group is above the second pre-determined threshold and the determination that the reference to the user of the social network is contained within the discussion forum to the members of the same group.

12. The computer program product of claim 11, wherein the instructions, when executed, are further configured to cause the at least one processor to:
   determine that the two or more of the number of the reporters are members of the same group when at least one commonality exists between the two or more of the number of the reporters.

13. The computer program product of claim 11, wherein the instructions, when executed, are further configured to cause the at least one processor to:
   generate the notification for transmission thereof to an administrator of the network use policies.

* * * * *